US007111117B2

(12) United States Patent
Franklin et al.

(10) Patent No.: US 7,111,117 B2
(45) Date of Patent: Sep. 19, 2006

(54) EXPANSION OF RAID SUBSYSTEMS USING SPARE SPACE WITH IMMEDIATE ACCESS TO NEW SPACE

(75) Inventors: Chris R. Franklin, Merrimack, NH (US); Jeffrey T. Wong, Newton, MA (US)

(73) Assignee: Broadcom Corporation, Irvine, CA (US)

(*) Notice: Subject to any disclaimer, the term of this patent is extended or adjusted under 35 U.S.C. 154(b) by 551 days.

(21) Appl. No.: 10/033,997

(22) Filed: Dec. 19, 2001

(65) Prior Publication Data

US 2003/0115412 A1    Jun. 19, 2003

(51) Int. Cl.
*G06F 13/00* (2006.01)

(52) U.S. Cl. .................................... 711/114
(58) Field of Classification Search ................. 711/114
See application file for complete search history.

(56) References Cited

U.S. PATENT DOCUMENTS

| 5,524,204 | A | * | 6/1996 | Verdoorn, Jr. ................. 714/6 |
| 5,542,065 | A | * | 7/1996 | Burkes et al. ............... 711/114 |
| 5,615,352 | A | * | 3/1997 | Jacobson et al. ........... 711/114 |
| 5,657,468 | A | * | 8/1997 | Stallmo et al. ............. 711/114 |
| 5,666,512 | A | * | 9/1997 | Nelson et al. .............. 711/114 |
| 5,758,118 | A | | 5/1998 | Choy et al. .................. 395/441 |
| 5,809,224 | A | | 9/1998 | Schultz et al. ......... 395/182.05 |
| 5,875,457 | A | * | 2/1999 | Shalit ......................... 711/114 |
| 6,000,010 | A | | 12/1999 | Legg .......................... 711/114 |
| 6,035,373 | A | | 3/2000 | Iwata ......................... 711/114 |
| 6,067,635 | A | * | 5/2000 | DeKoning et al. ............. 714/6 |
| 6,304,941 | B1 | * | 10/2001 | Lyons et al. ................ 711/114 |
| 6,530,004 | B1 | * | 3/2003 | King et al. ................. 711/165 |

* cited by examiner

*Primary Examiner*—Pierre Bataille
*Assistant Examiner*—Sheng-Jen Tsai
(74) *Attorney, Agent, or Firm*—Sterne, Kessler, Goldstein & Fox P.L.L.C.

(57) ABSTRACT

A method to expand a RAID subsystem from a first array of disk drives to a second array of disk drives. The first array includes a set of data disk drives storing old data and spare space, and the second array includes the first array and at least one new disk drive. First, the old data are distributed among the set of data disk drives and at least one new disk drive while, at the same time, new data are mapped to the spare space. Upon completion of the distribution, the new data are copied from the spare space to the set of data disk drives and at least one new disk drive to enable concurrent expansion of the first array while accessing the old and the new data.

11 Claims, 12 Drawing Sheets

400

EXPANSION OF RAID SUBSYSTEMS USING SPARE SPACE WITH IMMEDIATE ACCESS TO NEW SPACE

FIELD OF THE INVENTION

This invention relates generally to the field of disk storage subsystems, and more particularly to expanding redundant arrays of independent disks (RAID) subsystems.

BACKGROUND OF THE INVENTION

Most modern, mid-range to high-end disk storage subsystems are arranged as redundant arrays of independent disks (RAID). A number of RAID levels are known. RAID-1 includes sets of N data disk drives and N mirror disk drives for storing copies of the data disk drives. RAID-3 includes sets of N data disk drives and one parity disk. RAID-4 also includes sets of N+1 disk drives, however, data transfers are performed in multi-block operations. RAID-5 distributes parity data across all disk drives in each set of N+1 disk drives. At any level, it is desired to have RAID systems where an input/output (I/O) operation can be performed with minimal operating system intervention.

When a drive fails, the redundant data are used to reconstruct all of the failed data on the array. While the RAID subsystem is reconstructing the data of the failed drive for the user, the RAID array is vulnerable to a second disk failure. When the array is in this state of reconstruction, it is known as a degraded array, as opposed to being fully protected.

Because degraded arrays can cause failure of services to a user with only one drive failure, it is imperative to minimize the time the array is in the degraded state. To alleviate this problem, RAID subsystems use the concept of a hot spare space. Spare space can either be allocated on a dedicated spare disk, or allocated in a distributed manner over all of the active disk drives of the array. When the array is in the degraded state, the RAID subsystem can immediately begin to repair the array by generating a new set of user and redundant data in the spare space. When the rebuild is complete, the RAID array is again in a fully protected state.

FIG. 1 shows a RAID array 110 with spare space 100. The RAID array 110 can failover 120 to the spare space 100 should one of the disk drives 111–116 fail. The spare space 100 can be located on the disk drives 111–116 or on a dedicated disk drive.

Unfortunately, the spare space has drawbacks because it leaves a large amount of disk space unused. Some RAID subsystems have tried to use this empty space in a very narrow fashion. See for example, U.S. Pat. No. 5,666,512 issued to Nelson on Sep. 9, 1997 "Disk Array Having Hot Spare Resources To Store User Data."

In addition to the spare space being part of most modern RAID subsystems, special features such as RAID level migration, i.e., changing RAID levels, and RAID array expansion, i.e., making RAID arrays larger, are becoming basic requirements in any RAID implementation. The functionality of changing RAID levels and array size expansion should be dynamic, allowing users to access the data while these changes take place.

RAID array expansion, for RAID levels which stripe across disk drives in particular, can be a difficult task. In known RAID subsystems, the expansion takes place by adding a new disk, blocking access to all of the new space on the new disk and then distributing the data in the RAID array to the expanded array of disk drives, while the additional new disk cannot be used. Only when the distribution is complete, can access to that new space be permitted so that new data can be stored again.

The reason why the new disk cannot be used for new data are that the new data would need to be stored someplace. Attempting to store the data on the new disk, and then distributing the data cannot be done because the distributed data would overlap both old and new data mapping.

When an array needs to be expanded, it presents a difficult situation, especially when files storing old data cannot be deleted, and there is insufficient storage for new data. Even with modern RAID arrays, which do not block data access while expanding, the process of redistributing the old data can take many hours, or perhaps even days, under extreme I/O load conditions. The inability to add new data during this time would be a severe constraint in any file or database system where the "turn-over" of data are short-term.

Therefore, there is a need for a system and method for expanding a RAID subsystem in such a way that access to both old and new data are not interrupted.

SUMMARY OF THE INVENTION

It is an object of the invention to allow instant access to expanded space by using disk space previously allocated for hot spare failover of the array in the event of a disk drive failure. While the user is accessing the expanded space, data are redistributed so that the expanded space can be used. In the case of a separate disk containing all of the spare space, the expanded space is temporarily concatenated at the end of the original array. When expansion is done, the last step is to take the data on the spare disk and copy it back to the expanded array configuration.

In the case of distributed spare space, the spare space is concatenated at the end of the array, but the spare space can also be distributed in the same format as the original array, allowing for protection of the immediately available space. As the last step of expansion, the data temporarily stored in the distributed spare space is is copied into the expanded array. This instant expansion can be done with any amount of space, provided that there is enough temporary space to do the original concatenation.

More particularly, a method expands a RAID subsystem from a first array of disk drives to a second array of disk drives. The first array includes a set of data disk drives storing old data and spare space, and the second array includes the first array and at least one new disk drive. First, the old data are distributed among the set of data disk drives and at least one new disk drive, while at the same time, new data are mapped to the spare space. Upon completion of the distribution, the new data are copied from the spare space to the set of data disk drives and the at least one new disk drive to enable concurrent expansion of the first array while accessing the old and the new data.

DETAILED DESCRIPTION OF THE PREFERRED EMBODIMENTS

Instant Expansion of an Array with a Spare Disk

Figure 1:
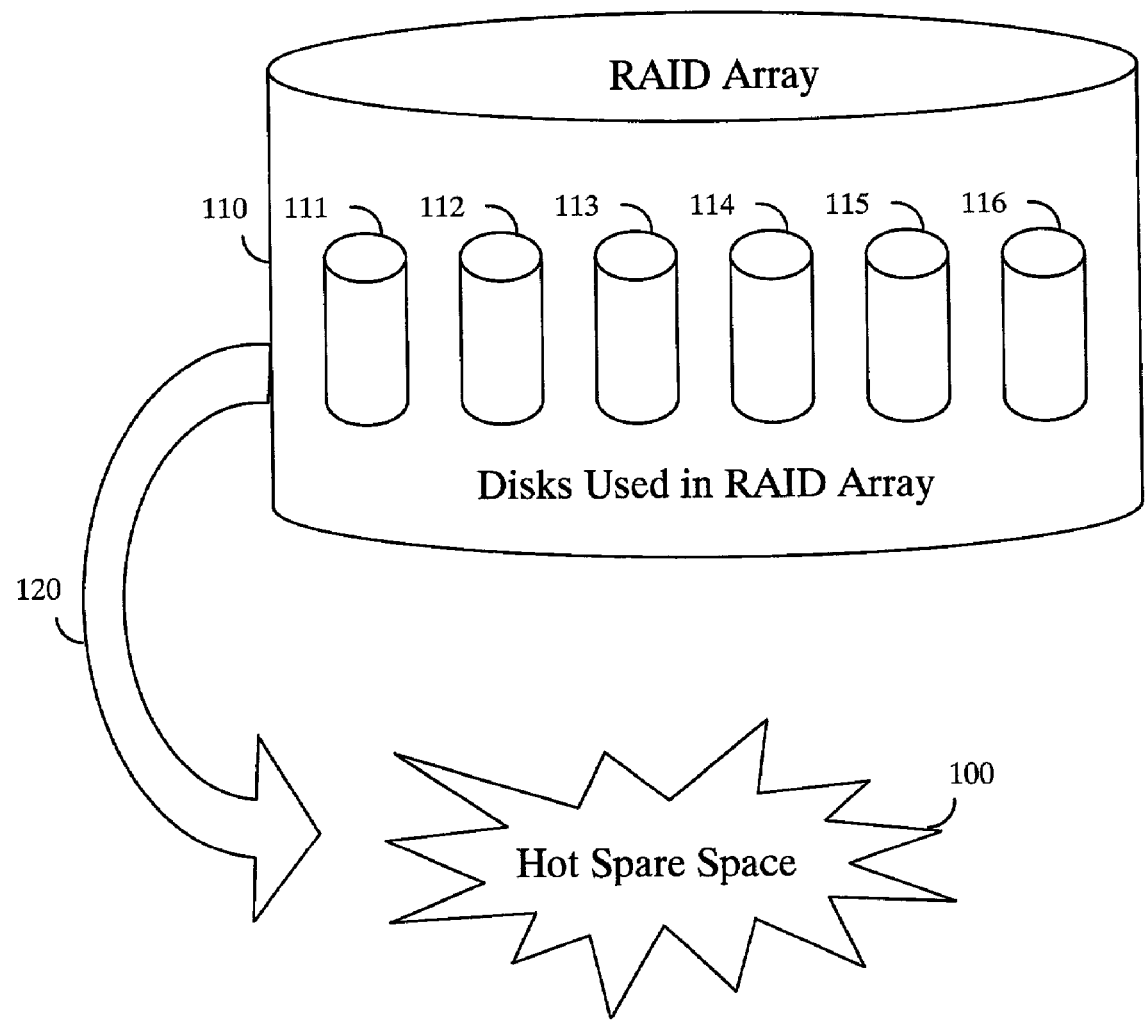
FIG. 1 is a block diagram of a prior art RAID array configured with spare space.
Figure 2:
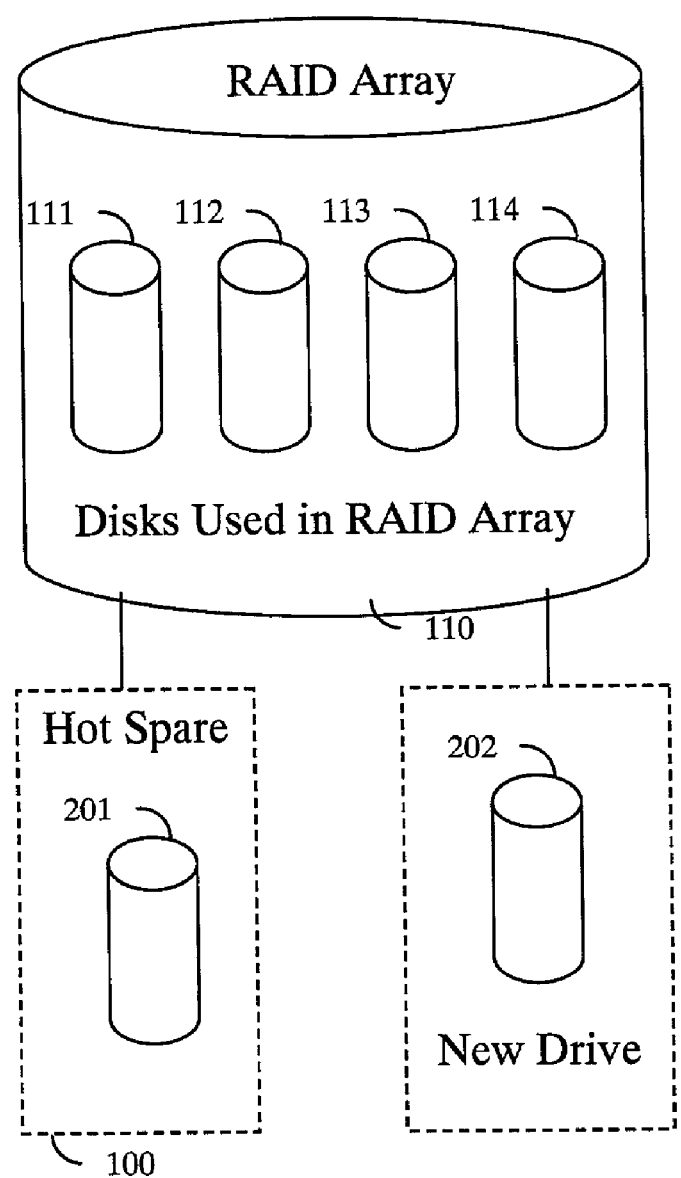
FIG. 2 is a block diagram of a RAID array that has a spare disk and a new drive to be added according to the invention.

FIG. 2 shows a RAID array 110 to be expanded using a new disk drive 202. The RAID array 110 includes four disk drives 111–114 for storing existent or "old" data in, for example, a RAID5 configuration. Spare space 100 is configured on a single dedicated disk drive 201. The spare space 100 is the same size as each of the disk drives 111–114 and the new disk drive 202.

Figure 3:
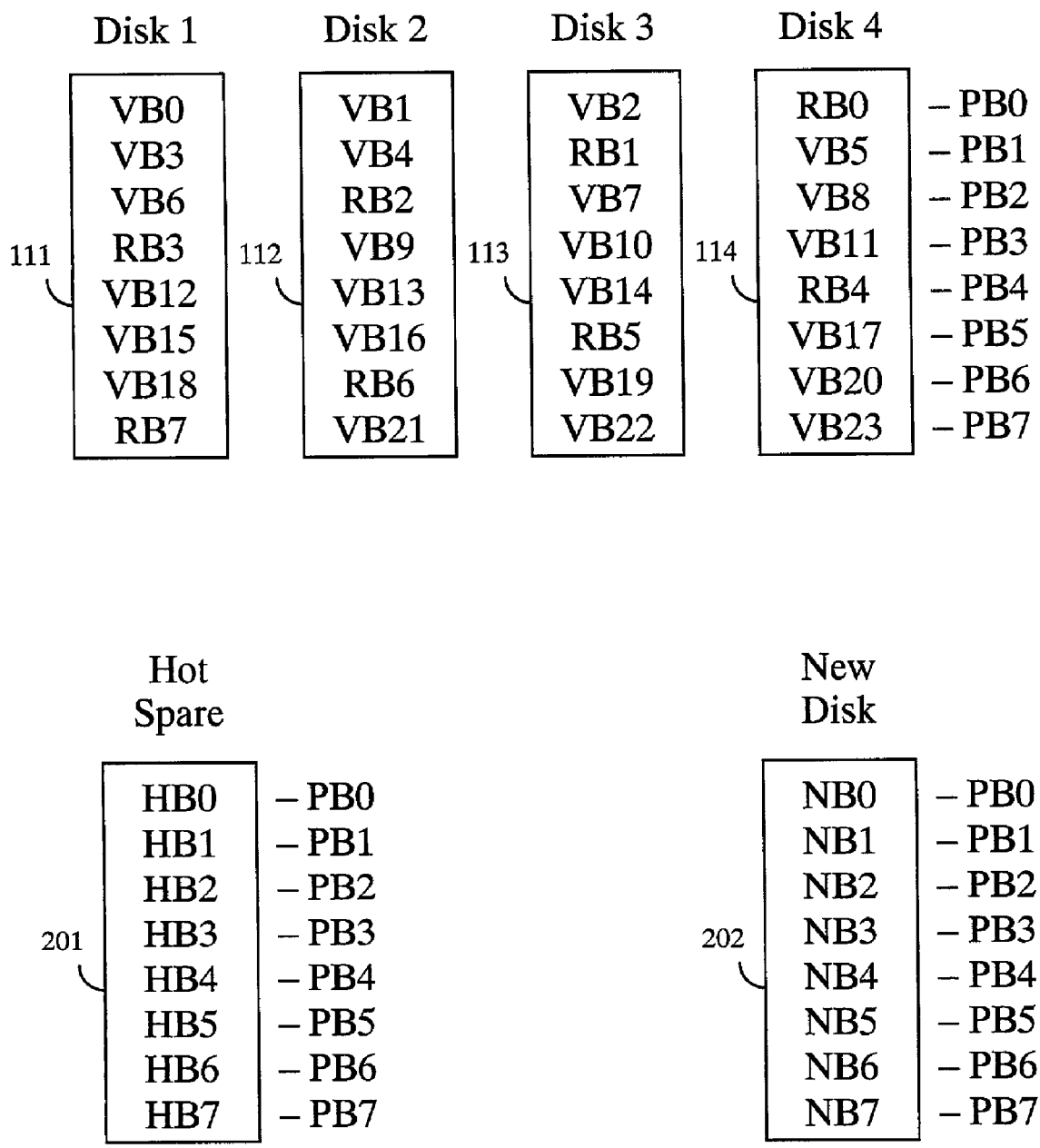
FIG. 3 is a block diagram of the RAID array disk drives, spare and new disk blocks according to the invention.

FIG. 3 shows blocks of the disk drives 111–114 and how those blocks are mapped for use in the RAID5 array. Each disk drive has physical blocks (PB0–PB7) storing old data used by the array. Virtual blocks (VB0–VB23) are the blocks accessed by the user of the array, and redundant blocks (RB0–RB7) are the blocks that allow reconstruction of the data in the event of a failure in one of the disk drives 111–114. When a disk drive fails, blocks (HB0–HB7) of the spare space are immediately used to rebuild the array. FIG. 3 also shows new blocks (NB0–NB7) of the new disk drive 202.

Figure 4:
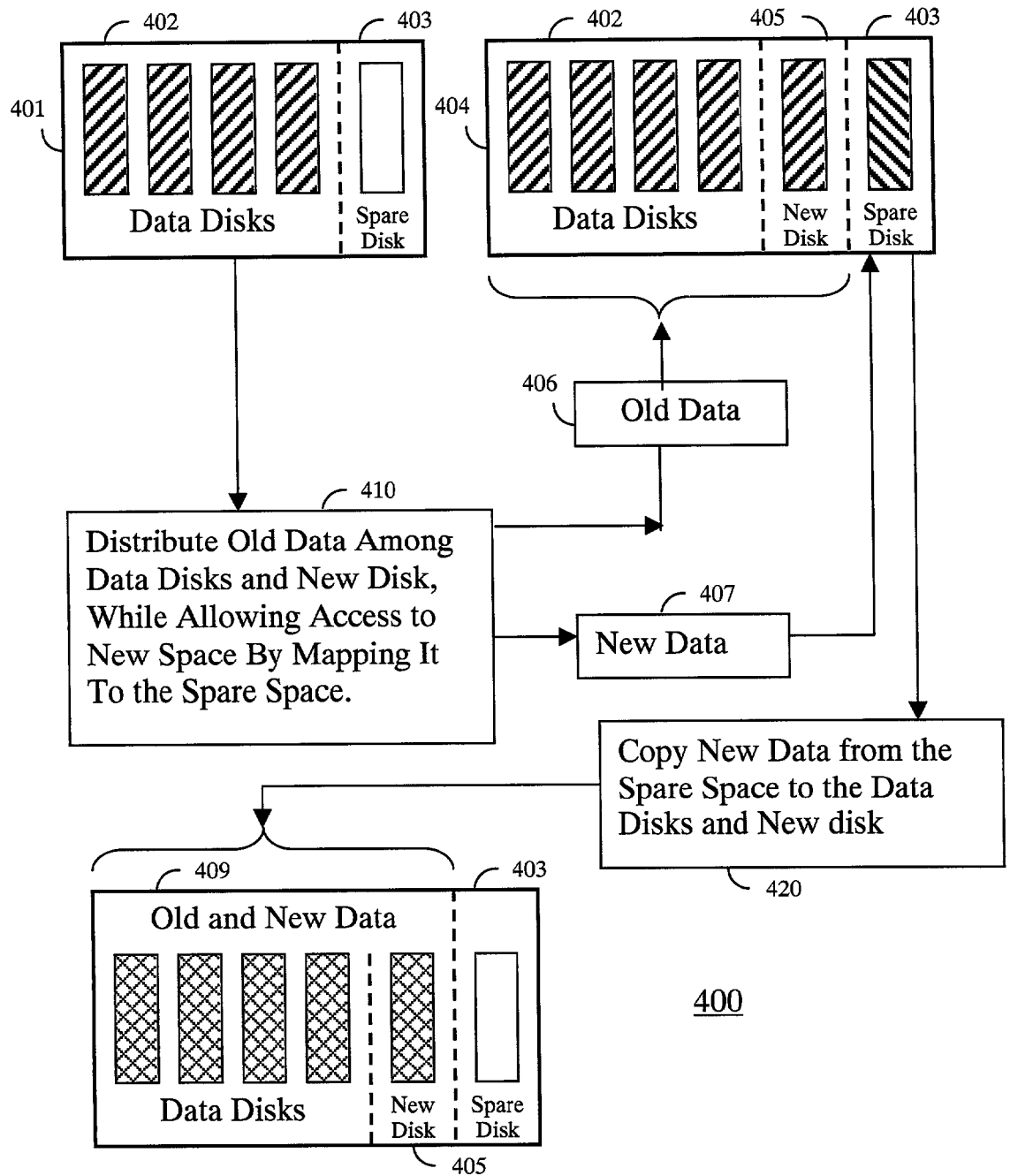
FIG. 4 is a block diagram of a method for expanding a RAID subsystem according to the invention.

FIG. 4 shows a method 400 for expanding a RAID subsystem using spare space and with immediate access to new data according to the invention. A first array configuration of disk drives 401 includes a set of data disk drives 402 storing old data and initialized spare space 403. When expansion is requested, that array configuration changes to a second array configuration 404 which has the data disks 402, the new disk 405, and the spare disk 403 which will immediately hold new data for the expanded array.

While the array configuration 404 is in place, the old data 406 from the set of data disk drives 402 are distributed 410 among the set of data disk drives 402 and at least one new disk drive 405. While the old data 406 are distributed to the expanded array using the new disk 405, any new data 407 written to the expanded array are mapped to the spare space 403. As the new data 407 are mapped, user access, i.e., read and writes to the new data 407 are possible immediately.

Upon completion of the distribution of the old data 406 to the expanded configuration containing the original data disks 402 and the new disk 405, the new data are copied 420 from the spare space 403 to the set of data disk drives 409 which now includes at least one new disk drive 405. After the copying completes, the spare space 403 reverts to its normal usage. This method enables concurrent expansion of the array while accessing both the old data and the new data in an expanded area of disk space.

It should be noted that all data writes, for the old and new data during the distributing and mapping, are done in a manner appropriate for the RAID-level of the space being used to hold that specific data. Data locking for sets of blocks that are moved interrupts user access for only fractions of seconds. More importantly, data access to new data are effective immediately, and not held up for hours or days as with prior art expansion methods.

Figure 5:
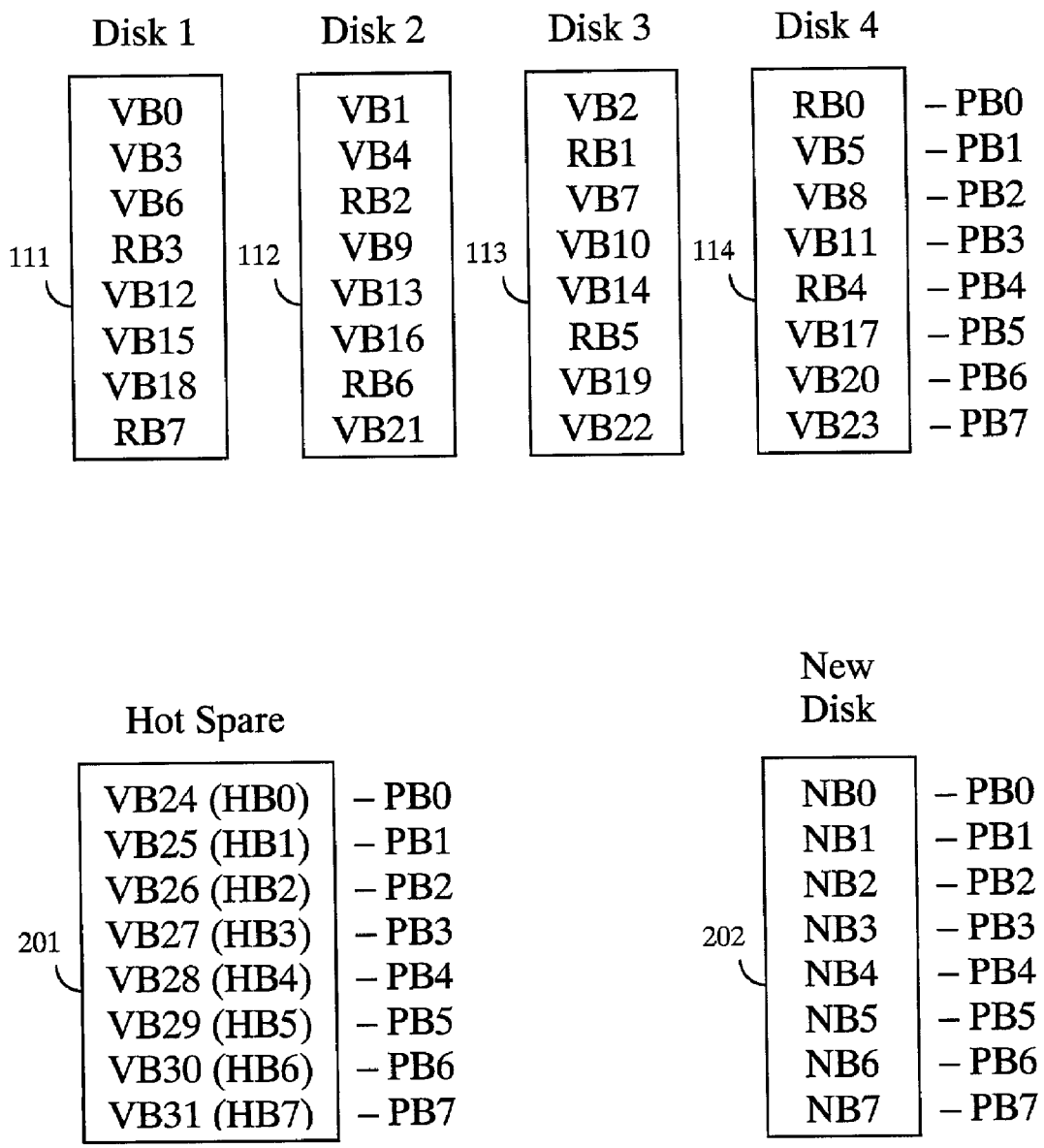
FIG. 5 is a block diagram of the first step of instant expansion of the RAID array described in FIG. 1 according to the invention.

FIG. 5 shows the data structures during the expansion of the configuration as shown in FIG. 4. The spare blocks HB0–HB7 on the spare disk drive 201 are immediately used for storing the new data, and the spare space is available without having to wait for data distribution to complete.

Figure 6:
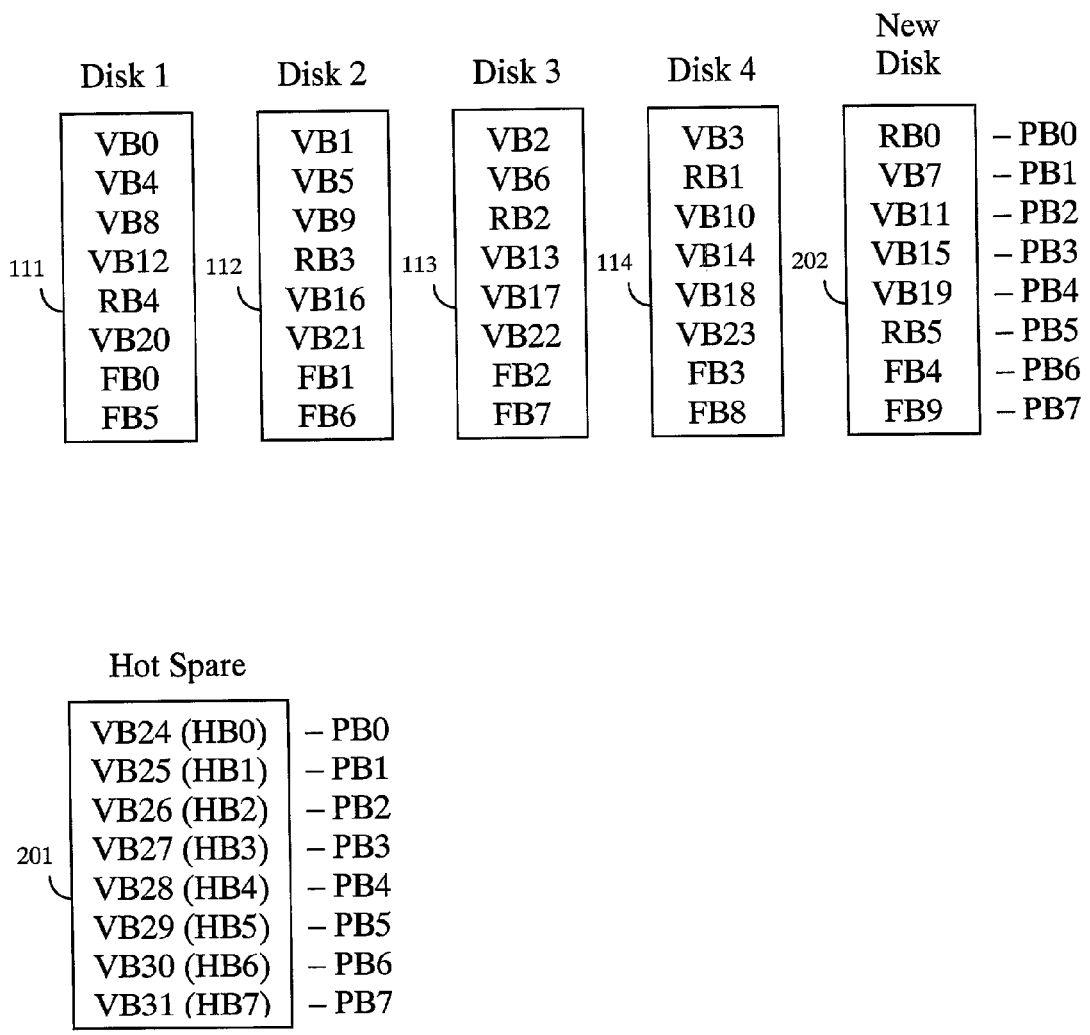
FIG. 6 is a block diagram of an intermediate step of instant expansion of the RAID array described in FIG. 1 according to the invention.

FIG. 6 shows intermediate data structures during the expansion method. All of the blocks are copied to their new location, with the new disk drive becoming part of the expanded array. For example, the steps taken to achieve this structure are as follows: blocks VB0–VB3 from the original array are copied to blocks PB0 of disk drives 1–4, and new redundant block RB0 is generated and placed in block PB0 of the new disk drive 202. Next, blocks VB4–VB7 are copied to their new locations at PB1 across the new array with block RB1 being generated on disk drive 4 114. Similarly, blocks VB8–VB11 are copied to blocks PB2, with block RB2 being generated, blocks VB12–15 are copied to block PB3 with block RB3 being generated, until blocks VB20–23 are copied to blocks PB5 with block RB5 being generated.

The copying described in the preceding paragraph takes time, especially on very large RAID arrays. The sequence is the same in all cases. While the expansion is proceeding, the virtual blocks are accessed at their old locations before they are copied, and at their new locations after they are copied. The new virtual blocks (VB24–VB31) are still located on the spare disk drive's physical blocks (PB0–PB7). The last two physical blocks, (PB6–PB7), on all of the disk drives now have unused space, shown as free blocks (FB0–FB9).

Figure 7:
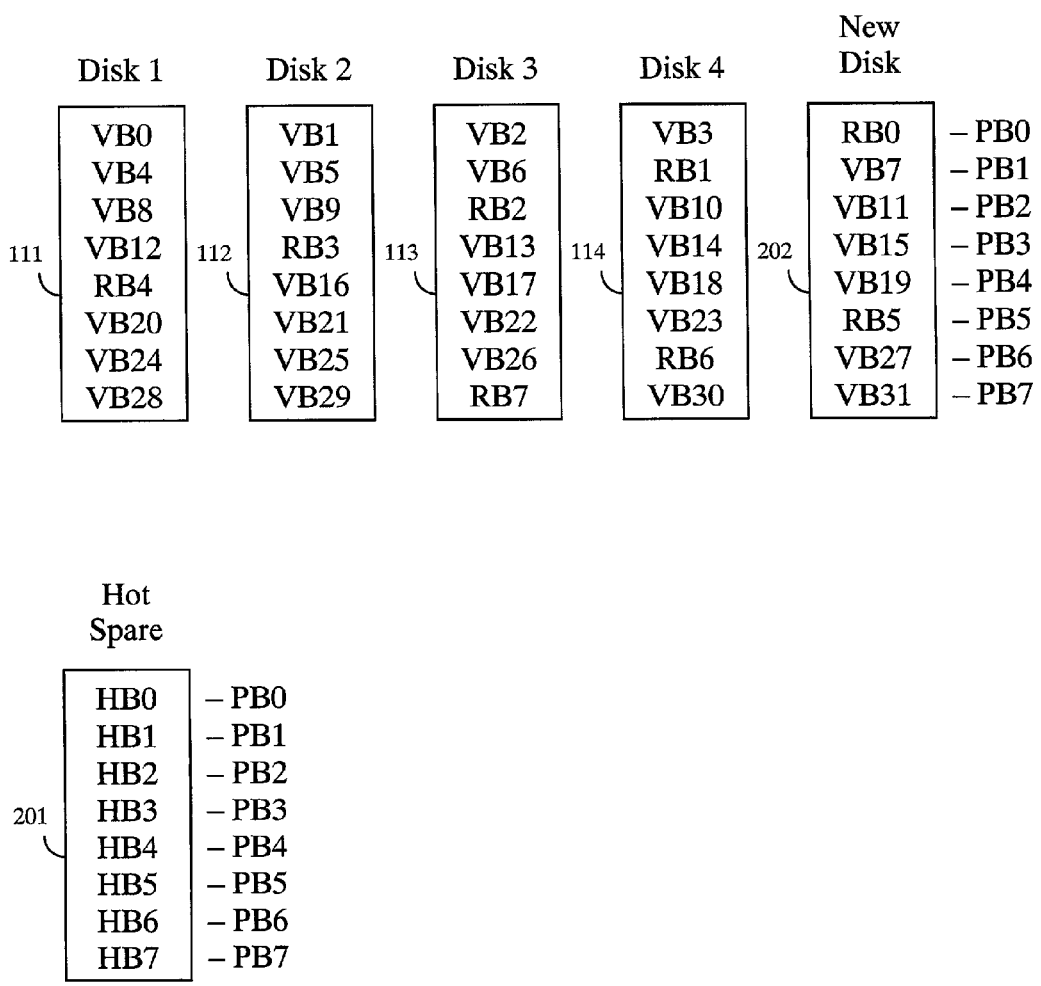
FIG. 7 is a block diagram of the final result of instant expansion of the RAID array described in FIG. 1 according to the invention.

FIG. 7 shows the final structure of the blocks in the expanded array. To get from the intermediate structure to this final structure, blocks VB24–VB27 are copied into blocks PB6 of the disk drives 111–114, 202, and block RB6 is generated. Then, blocks VB28–VB31 are copied from the spare blocks to blocks PB7 of all of the disk drives and block RB7 is generated. After the copying, the spare blocks are freed, and blocks HB0–HB7 are now used as spare space for the expanded array.

Instant Expansion of an Array with Immediate Protection

Figure 8:
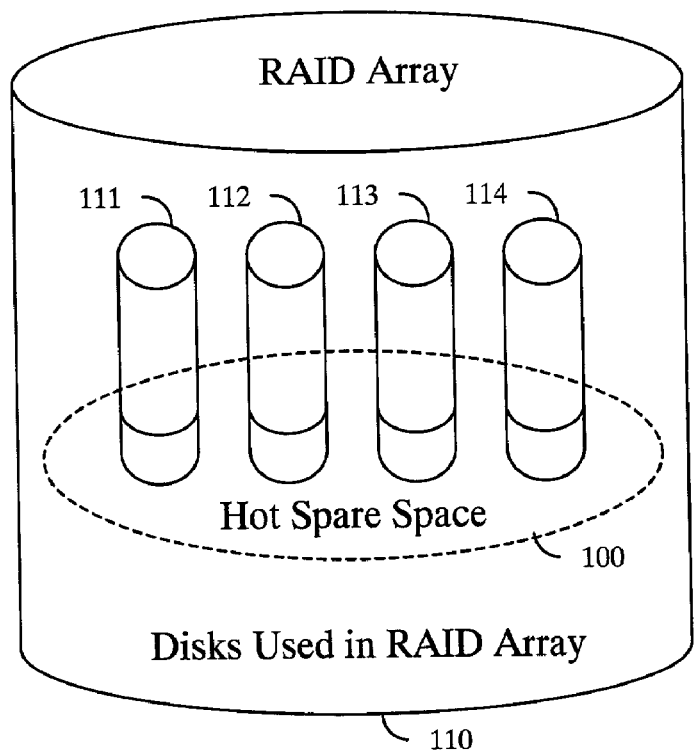
FIG. 8 is a block diagram of a RAID array that has distributed spare space and a new drive to be added according to the invention.
Figure 8:
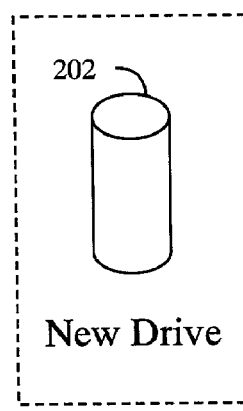

Another configuration that allows for automatic rebuild is having spare space with spare blocks distributed among the drives that are used in an array. FIG. 8 shows an initial configuration with four disk drives 111–114, each of which has space allocated for spare space 100. This makes up the protected array 110. A new drive 202 is added to expand the array.

Figure 9:
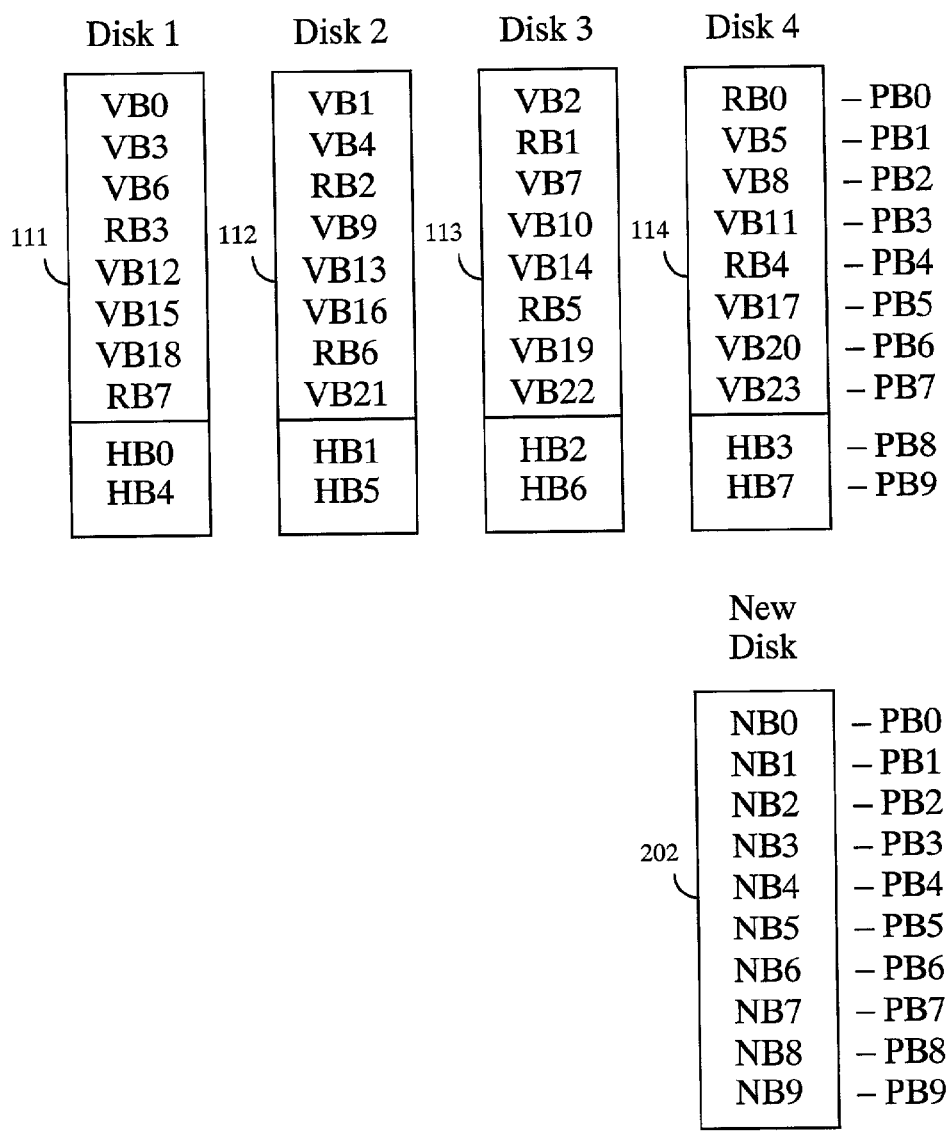
FIG. 9 is a block diagram of the RAID array disk drives, spare and new disk blocks according to the invention.

FIG. 9 shows the blocks as they are stored on all of the disk drives involved in the instant expansion. The disk drives in the array 111–114 contain the user virtual blocks (VB0–VB23) and the redundant blocks (RB0–RB7), which are in the disk drives physical blocks (PB0–PB7). In addition, a portion of the disk drives is reserved as spare blocks (HB0–HB7). These blocks are located on physical blocks (PB8–PB9) across each of the disk drives. The new blocks (NB0–NB9) are shown on the new disk drive 202, which is the same size as the disk drives 111–114. When the array for the disk drives 111–114 is created, the spare space is not just allocated, but also initialized to zero. The parity data generated from a set of virtual blocks that are zero is zero, so the spare space is initialized in such a way that the parity data are consistent with the data. The new blocks (NB0–NB9) are also initialized to zero, with corresponding parity data.

Figure 10:
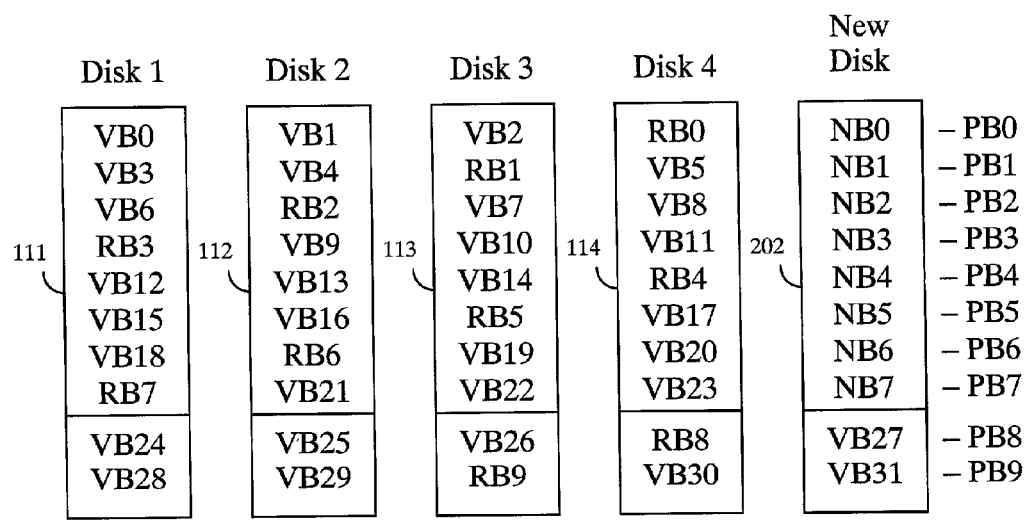
FIG. 10 is a block diagram of the first step of instant expansion of the RAID array described in FIG. 7 according to the invention.

FIG. 10 shows the data structure in expanding the array. As soon as expansion is requested by the user, the four disk drives 111–114 in the array and the new disk drive 202 have the new virtual blocks VB24–VB31 stored in the last physical blocks that were either the spare space or last blocks on the new disk drive, i.e., blocks PB8–PB9 on all of the disk drives. Because these blocks were initialized to zero, the redundant blocks (RB8–RB9) stored there are consistent with the new virtual blocks (VB24–VB31) that are also initialized to zero. The user then has is immediate access to these blocks.

Note that initialization of the new blocks to zero is not necessary when all writes done to the new region are done with parity generation. In this case, the new area is handled different, causing a read of all the data whenever new data are written to generate correct parity regardless of the original state of initialization.

Figure 11:
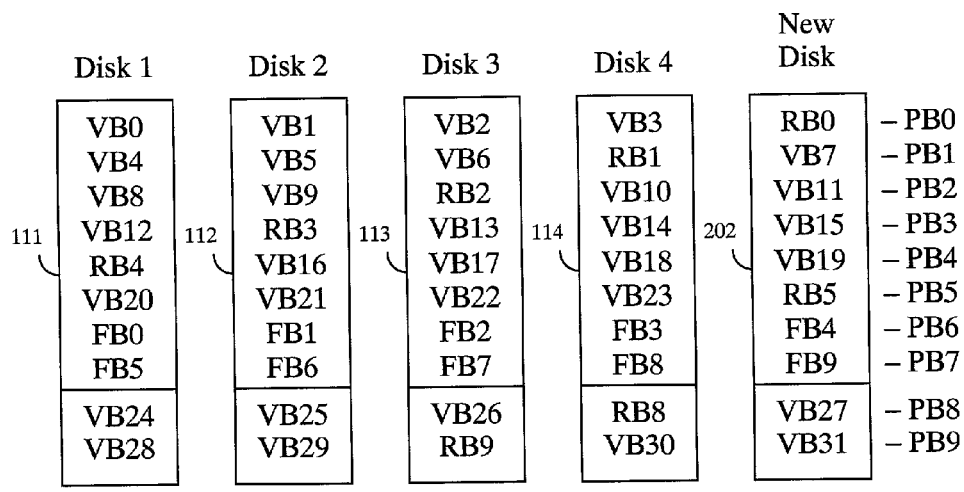
FIG. 11 is a block diagram of an intermediate step of instant expansion of the RAID array described in FIG. 7 according to the invention.

FIG. 11 shows the intermediate data structures while completing the expansion.

The original virtual blocks (VB0–VB23) have been moved to their new locations in the disk drives 111–114 and the new disk drive 202.

To get from FIG. 10 to FIG. 11, the blocks are moved in the following sequence: blocks VB0–VB3 are moved to blocks PB0 of disk drive 111–114, and the redundant block RB0 is generated and placed on block PB0 of the new disk drive, which used to be block NB0. Next, blocks VB4–VB7 are copied to disk drive 1–3 and the new disk drive at block PB1, and redundant data RB1 are generated for that virtual data. Likewise, blocks VB8–VB11 are moved with block RB2 being generated for blocks PB2 across all the disk drives, until the final blocks VB20–VB23 are moved with parity block RB5 being generated and placed on the new disk drive a block PB5.

While the above restructuring is done, any disk drive can fail, and there is sufficient data and redundant data to reconstruct all of the failed virtual blocks. The blocks that have not been copied are protected by their old configuration on the four disk drives. The blocks that have been copied are protected in the new five disk drive configuration. Also, the new data in blocks VB24–VB31 can be reconstructed because they have redundant blocks RB8 and RB9.

When the copying is complete and the disk drives are shown as in FIG. 10, there are free blocks that are no longer used. These free blocks contain blocks VB18–23. However, these blocks have been copied into the new expanded space. The free blocks FB0–FB9 can now be used for the last step of copying the final virtual blocks VB24–VB31 into the new configuration so all the data is contiguous and the spare space is at the very end of the disk drives.

Figure 12:
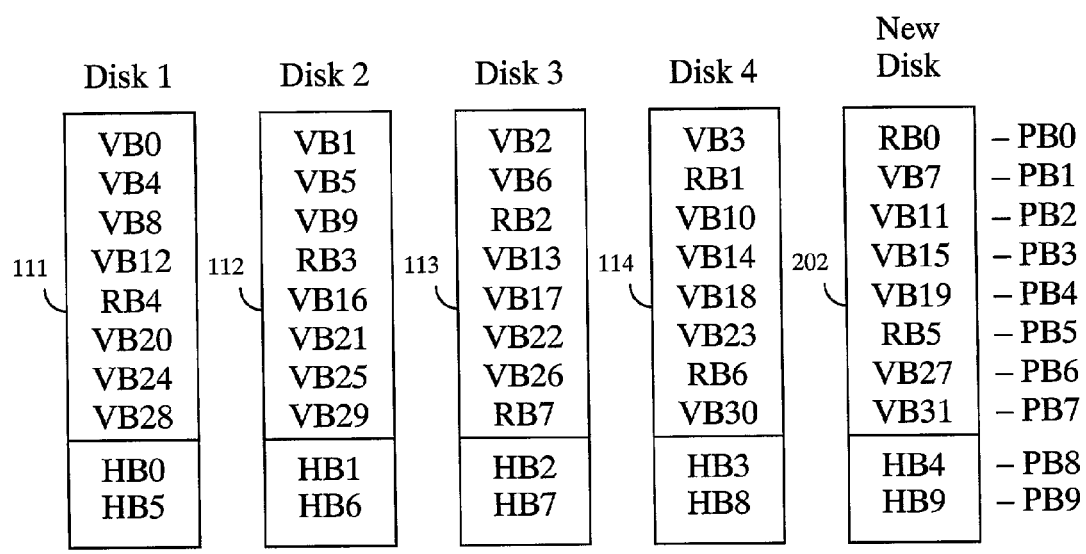
FIG. 12 is a block diagram of the final result of instant expansion of the RAID array described in FIG. 7 according to the invention.

FIG. 12 shows the expanded configuration. In this configuration, blocks VB0–VB31 have been copied to the new five disk drive configuration, and blocks with new redundant information in blocks RB0–RB7 use blocks PB0–7 of all five disk drives. Blocks PB8 and PB9 of all of the disk drives now have the new spare space blocks HB0–HB9, which enables recovery for any failed disk drive.

Expansion with More than One New Disk Drive

In some cases, a user may want to add multiple drives to do an expansion. If there is enough spare space to survive drive failures, the operation described above can be done with two additional drives instead of one. In fact, the operation can be done with any number of drives, if there is enough spare space to use as temporary space to give the user immediate access to new data.

Expansion of Non-Redundant Arrays

The expansion described above illustrates instant expansion with a redundant array. This method can also apply to arrays that do not have redundant data. In this case, no redundant blocks (RB0–RB7) are created when the data are copied to the new array configuration.

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

We claim:

1. A method for expanding a RAID subsystem from a first array of disk drives to a second array of disk drives, the first array including a set of data disk drives storing old data and spare space, and the second array including the first array and at least one new disk drive, comprising:
   initializing the spare space to all zero data;
   distributing the old data among the set of data disk drives and at least one new disk drive while mapping new data to the spare space of the first array; and
   copying, upon completion of the distribution, the new data from the spare space to the set of data disk drives and at least one new disk drive to enable concurrent expansion of the first array while accessing the old and the new data.

2. The method of claim 1 further comprising:
allocating the spare space among the first array of disk drives.

3. The method of claim 1 wherein the new data are mapped redundantly.

4. The method of claim 1 further comprising:
generating parity data for the initialized spare space.

5. The method of claim 1 further comprising:
initializing at least one new disk drive; and
generating parity data for the initialized new disk drive.

6. The method of claim 1 further comprising:
determining parity data for the new data from the new data and the old data.

7. An expandable RAID subsystem, comprising:
a first array of disk drives including a set of data disk drives storing old data and spare space;
a second array of disk drives including the first array and at least one new disk drive;
means for initializing the spare space to all zero data;
means for distributing the old data among the set of data disk drives and at least one new disk drive while mapping new data to the spare space of the first array;
means for copying, upon completion of the distribution, the new data from the spare space to the set of data disk drives and at least one new disk drive to enable concurrent expansion of the first array while accessing the old and the new data.

8. The subsystem of claim 7 wherein the spare space is distributed and initialized to zero.

9. The subsystem of claim 7 where the spare space is allocated to an initialized dedicated disk drive.

10. A method for expanding a RAID subsystem from a first array of disk drives to a second array of disk drives, the first array including a set of data disk drives for storing old data and containing spare space, and the second array including the first array and at least one new disk drive, comprising:

distributing the old data among the set of data disk drives and at least one new disk drive while mapping new data to the spare space, wherein the spare space is allocated on a dedicated spare drive of the first disk drive array; and copying, upon completion of the distribution, the new data from the spare space to the set of data disk drives and at least one new disk drive to enable concurrent expansion of the first array while accessing the old and the new data.

11. An expandable RAID subsystem, comprising:

a first array of disk drives including a set of data disk drives for storing old data and containing spare space;

a second array of disk drives including the first array and at least one new disk drive;

means for allocating the spare space on a dedicated spare drive of the first array of disk drives;

means for distributing the old data among the set of data disk drives and at least one new disk drive and for mapping new data to the spare space of the first array while distributing the old data; and means for copying, upon completion of the distribution, the new data from the spare space to the set of data disk drives and at least one new disk drive to enable concurrent expansion of the first array while accessing the old and the new data.

* * * * *